(No Model.) 3 Sheets—Sheet 2.
W. P. GINTER & W. STROUS.
SAW FILING MACHINE.
No. 506,222. Patented Oct. 10, 1893.
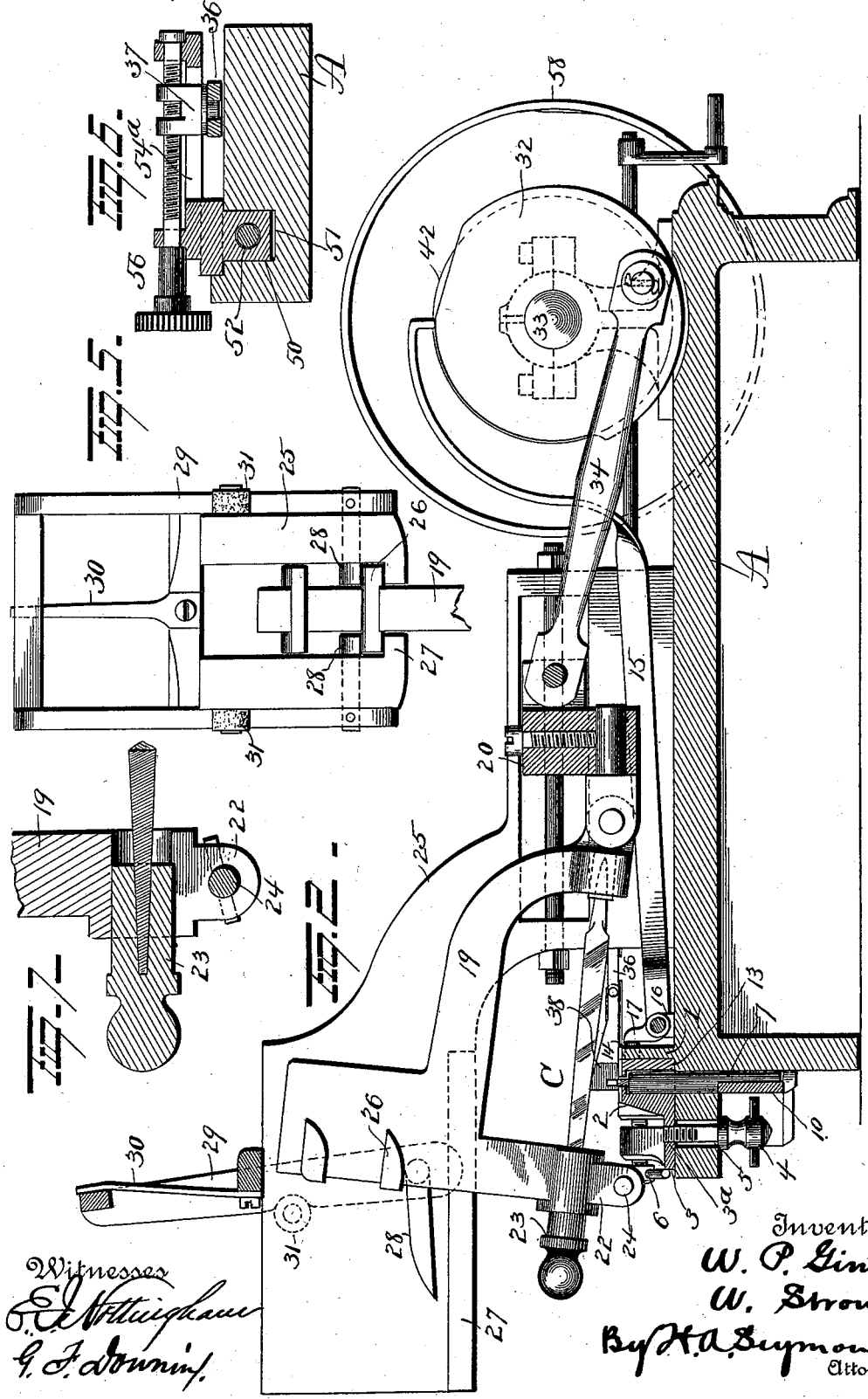
Witnesses
E. A. Nottingham
G. F. Downing
Inventors
W. P. Ginter &
W. Strous
By H. A. Seymour
Attorney

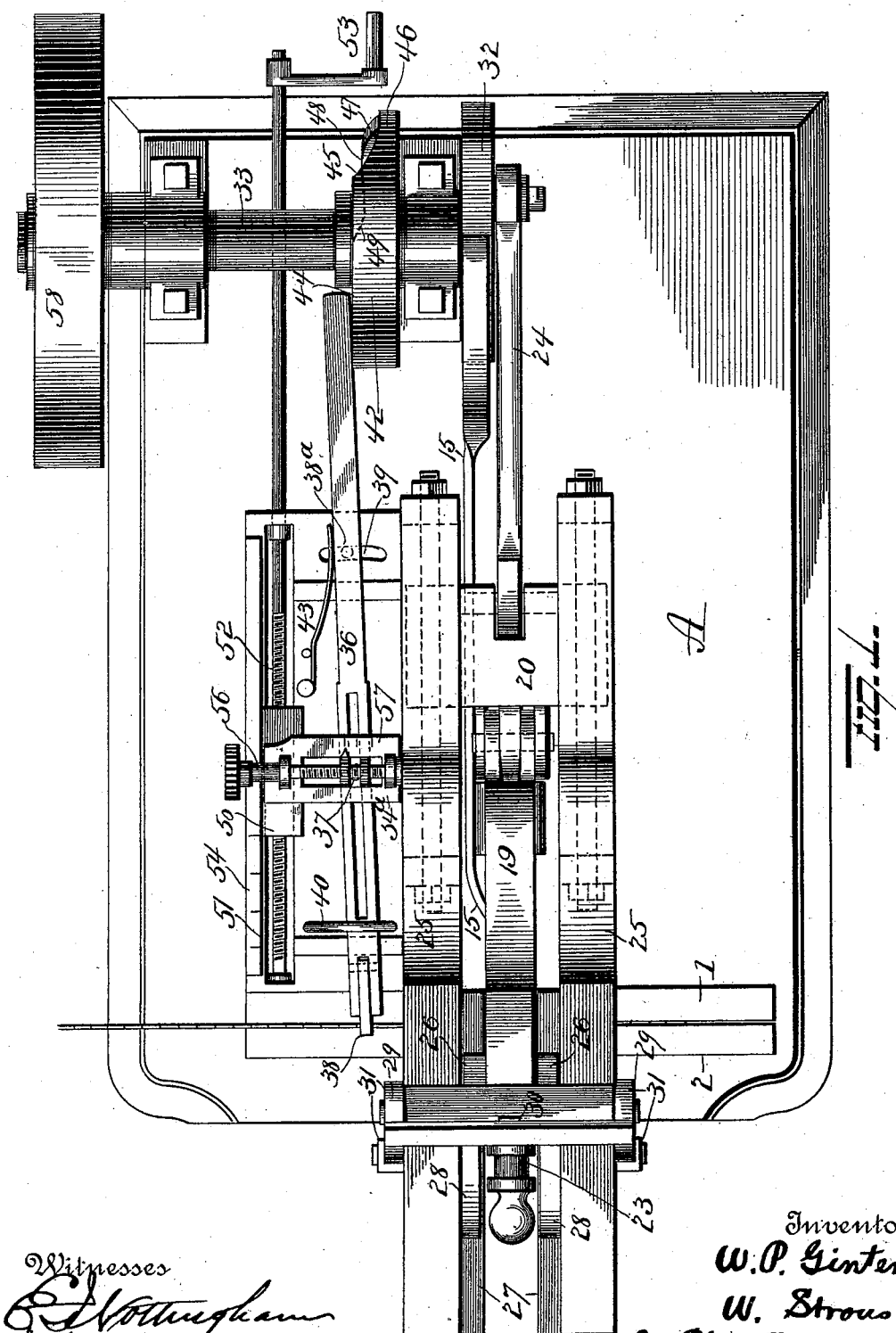

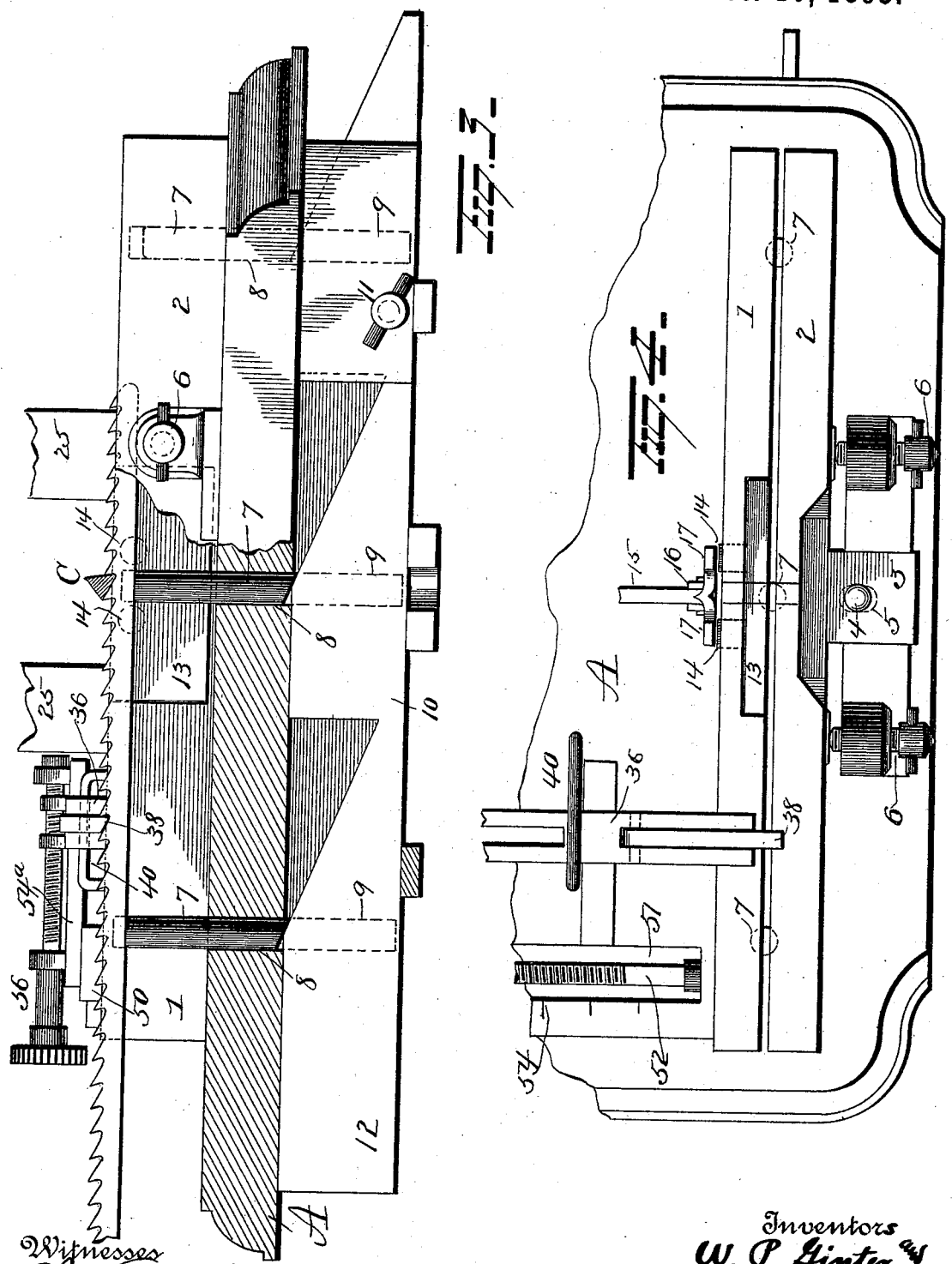

UNITED STATES PATENT OFFICE.

WILLIAM P. GINTER AND WILLIAM STROUS, OF HUGHESVILLE, ASSIGNORS OF ONE-THIRD TO JOHN H. B. TRAINER, OF WILLIAMSPORT, PENNSYLVANIA.

SAW-FILING MACHINE.

SPECIFICATION forming part of Letters Patent No. 506,222, dated October 10, 1893.

Application filed April 14, 1893. Serial No. 470,370. (No model.)

*To all whom it may concern:*

Be it known that we, WILLIAM P. GINTER and WILLIAM STROUS, of Hughesville, in the county of Lycoming and State of Pennsylvania, have invented certain new and useful Improvements in Saw-Filing Machines; and we do hereby declare the following to be a full, clear, and exact description of the invention, such as will enable others skilled in the art to which it appertains to make and use the same.

Our invention relates to an improvement in saw filing machines, the objects being to file all the teeth of the saw alike and uniformly; to feed the saw along automatically, one tooth at a time to a position to receive a pass of the file, and to provide against the possibility of the ends of the teeth being injured or "bearded" as it is called while the file is leaving the saw preparatory to making a pass across the next tooth.

A further object is to provide means for automatically clamping the saw and holding it rigidly clamped during the traverse of the file and finally releasing it during the return of the file so that the feed of the saw forward will be unobstructed.

A further object is to regulate the depth of cut upon the teeth in filing and to provide for various sizes of saws and saw teeth.

A still further object is to provide means for setting the machine to feed a saw the length of one tooth at a time no matter what the size or length of the teeth, and further objects are to provide a simple machine consisting of few parts and one not likely to get out of order, one which will be effective in the performance of its work and which can be placed on the market at a comparatively small price.

With these objects in view our invention consists in certain novel features of construction and combinations of parts which will be hereinafter described and pointed out in the claims.

In the accompanying drawings, Figure 1 is a plan view. Fig. 2 is a front end elevation, parts being broken away. Fig. 3 is a view in longitudinal section, and Figs. 4, 5, 6 and 7 are detail views.

A represents a bed-plate upon which the various parts of the machine are located. At one end are provided a pair of plates 1 and 2, which constitute a guide between which the saw blade B slides. The plate 1 is preferably stationary but the plate 2 is movable toward and away from the stationary plate so that the space between the plates may be varied for the accommodation of saw blades of different thicknesses. The movable plate 2 is provided with a foot 3 in which a threaded hole $3^a$ is formed. This foot projects forwardly at about right angles to the plate and rests flat upon the bed-plate, and a thumb-screw 4 passes up through an elongated hole 5 in the bed-plate into the hole in the foot and is adapted to secure the plate 2 in place when adjusted to the right position. In addition to this set screw, a pair of set screws 6, 6, may be provided in position to abut against the front of the plate. These may be employed or not as desired but when they are used the set screw 4 is first loosened and then the plate 2 is set up to the desired position by screws 6, 6, after which the plate is secured by screw 4. The lower edge of the saw blade rests upon a series of vertically movable slide bolts or rods 7, 7, which operate in grooves 8, 8 formed in the adjacent faces of plates 1 and 2 and through holes 9, 9 formed in the bed plate. These bolts or rods are adapted to drop by gravity when their support is removed and the saw blade resting upon them will of course drop with them. But should it be desirable a more positive action could be given them by means of springs. The bolts or rods might be raised in any convenient manner. We propose to do it by means of a slide plate 10 which operates in guides formed below the bed plate. This slide plate 10 is provided with a series of inclines or cams, one for each bolt or rod so that all are operated upon simultaneously when the plate is slid in one direction and all are permitted to drop as the slide plate is moved in the opposite direction. The slide plate is locked by a thumb screw 11. By turning the set screw 11 so as not to abut very snugly against the slide-plate, the plate could be moved to raise the pins or bolts 7, 7, and consequently the saw blade, by simply giving the plate a smart blow on the end 12. As the plates 1 and 2 are insufficient in themselves to hold the saw blade firmly while being filed and at the same time permit it to slide forward the length of one tooth in the interval between two passes of the file, provision is made for periodically clamping the blade while the file is traversing a tooth. This clamping might be accomplished in a number of different ways but as suitable for the purpose we have provided as follows: Plate 1 is cut away about half its thickness at the center and in this cut away portion a clamping plate 13 is fitted. Said plate is furnished on its rear with a pair of pins 14, 14 which pass loosely through holes in the plate. A long lever 15 which reaches back substantially the length of the machine to the drive shaft is pivoted to a post 16 in proximity to the rear of plate 1 and from this point a pair of toes 17, 17 project upward in position to strike the protruding rear ends of the pins 14, 14 when the lever is raised. By this construction of lever enormous power is applied upon the pins and consequently upon the clamping plate, when the free end of the lever is raised and when thus operated the saw blade is held perfectly rigid. The lever is vibrated by means of a cam wheel hereinafter to be described.

C represents the file. This may be a specially constructed file for the purpose or it may be an ordinary three cornered or other shaped file as desired, the essential feature not being the file, which in itself is old, but the file holder and the mechanism for reciprocating it which we will now describe in detail. The file holder 19 comprises a pair of jaws integral with each other and separated a distance approximately equal to the length of an ordinary file. This file holder is hinged to a reciprocating cross-head 20 which is guided in its movements after the usual manner. One of the jaws of the file holder is provided with a socket adapted to receive an end of the file, or a ferrule in which the end of the file is placed, and the other jaw is split as at 22 and in this split end a key 23 is held, said key being constructed to receive an end of the file and being capable of turning axially in the jaw or of being slid out and in for a limited distance. As a result of this provision the file may be turned to the exact position required when once placed between the jaws so as to strike the teeth at the proper angle. The split end of the jaw is closed tightly upon the key by means of a suitable thumb screw 24 whereby to hold the file securely and in the proper position. The file holder itself travels in a housing 25 and is provided with ears 26, 26, at the sides which slide outward upon the tracks 27, 27 in the housing. The weight of the file-holder is sufficient to cause the ears to normally drop to the tracks but a pressure in addition to the mere weight of the file holder is necessary in order to hold the file holder down and consequently the file to its work upon the saw-blade. For this purpose a presser frame 29 is provided. This frame is pivoted to the housing and is provided inside of the housing with presser feet 28, 28, beneath which the ears 26, 26 pass as the file-holder moves outward and over which the ears ride on their return, to the end that the file holder is held down to its work with the outward thrust of the file holder and raised a sufficient distance above the blade so that the file does not touch the teeth on its return movement. The presser frame is held forward yieldingly by a spring 30 and to prevent the continual clatter which would otherwise result, rubber buffers or stops 31, 31 are secured to the sides of the housing in position to be struck by the presser frame. So it will be seen that the spring holds the presser feet somewhat yieldingly upon the ears and yet with sufficient pressure to cause the file to cut the desired amount with each forward or outward pass across the saw blade. The cross head is reciprocated by means of a crank disk 32 on the drive shaft 33 to which the cross head is connected by a pitman 34 and the lever 15 is also operated by a peripheral cam 34 on this crank disk against which its free end rests by its own gravity. This cam preferably extends around about half of the periphery of the disk, or in other words it is of sufficient length to hold the clamp against the saw blade during the entire forward stroke of the file and file-holder. After leaving the cam, the lever drops upon the smaller portion of the periphery of the disk and hence relieves the pressure upon the clamping plate, and allows the saw blade to be fed forward for the next pass.

The feeding mechanism is constructed as follows: An oscillating lever 36 is connected with the bed plate preferably by means of a movable pivot 37 and it is provided at one end with a gravity dog 38 which is pivoted to the lever. This dog protrudes beyond the end of the lever in position to bear upon the teeth of the saw blade and it is beveled at one edge of its lower face as shown to facilitate its movement over the teeth in taking a new hold and to cause it to fit in the angle between the teeth to the end that a square purchase is had between the teeth. The weight of the dog is sufficient to cause it to drag lightly across the teeth but not sufficient to cause any harm to the teeth and also it may be remarked that the dog is located on the side of the file where it operates upon the teeth before they are sharpened. The lever is guided in its movements in any convenient manner as for instance by a pin $38^a$ at one end working in a slot 39 and an elongated staple 40 spanning it at the other end. The lever is oscillated at proper intervals by a cam on the side of a wheel 42 on the drive shaft, against which it is held yieldingly by a spring 43. This cam is straight as at 44 for a considerable portion of its peripheral length during the traverse of which portion the lever of course remains motionless.

This portion of the cam is so located relative to the parts which reciprocate the file holder that the lever traverses this part of the cam during the time that the file finishes its return and partially completes its forward pass. But just before the file holder reaches its extreme forward thrust, the bevel portion 45 of the cam reaches the lever. This allows the rear end of the lever, due to the action of the spring 43, to swing gradually inward and the end carrying the dog consequently swings in the opposite direction dragging the dog 38 the length of one tooth until the straight portion 46 of the cam has reached the lever, at which time the lever has swung inward as far as it will go, and the dog will have reached the highest point of the tooth it has been dragged over and dropped into the notch again. Now the lever and dog are ready to feed the saw blade forward and by the time the end of the straight portion 46 shall have reached the lever, the file and file holder are ready to return, but at this juncture a very important function of the machine is performed which is to feed the saw blade forward just far enough, during the momentary interval of time between the end of the forward stroke and the beginning of the return stroke so that the file in rising from the blade of the saw will clear the projecting or slightly overhanging point of the adjacent tooth and thus absolutely prevent mutilating or "bearding" it as it is termed. Heretofore this has been an objection to machines of this character as the file has frequently caused almost as much damage as it has done good. The portion of the cam which does this is shown at 47. After this a straight portion 48 reaches the lever and then the bevel portion 49 vibrates the lever and feeds the saw blade forward. This completes one revolution of the cam after which the operation is the same. The movable pivot 37 is capable of two adjustments, one being longitudinally and another transversely of the machine in order to regulate the length of vibration of the lever to the size of teeth of the saw being sharpened. This adjustment may be effected in different ways. As a convenient means we have shown the following: A block 50 is arranged to slide in a groove 51 in the bed plate A. This block is slid back and forth by a screw 52 which turns in it and the screw may have a milled head on the end or a small crank 53 by which it may be easily turned. A scale 54 is formed on the bed plate at one side of the groove 51 to indicate the position at which the block is to be placed for different sizes of saws. The block 50 is provided with a laterally projecting slotted plate 54ᵃ which extends over the oscillating lever 36. The pivot 37 is located in the slot of this plate and also in the elongated slot in lever 36 and a screw 56 passing through this pivot is adapted to be turned to adjust the pivot laterally. Plate 54 is also furnished with a scale 57 and pivot 37 is provided with a pointer which registers with the scale. This screw 56 has a milled head on its outer end by means of which it is manipulated. Thus by the proper manipulation of these two screws the oscillations of lever 36 are made to correspond to the number of teeth to the inch on the saw being filed.

Power is applied by hand or still better by a drive belt running on pulley 58 on the drive shaft.

It is evident that slight changes might be resorted to in the form and arrangement of the several parts described without departing from the spirit and scope of our invention and hence we do not wish to limit ourselves to the exact construction herein set forth; but, Having fully described our invention, what we claim as new, and desire to secure by Letters Patent, is—

1. In a saw filing machine, the combination with a pair of guide-plates between which the saw blade to be operated upon is adapted to be fed, of a sliding clamping plate located in position to be forced against the saw blade periodically whereby to hold it rigid while its teeth are being filed, substantially as set forth.

2. The combination with a pair of plates having a space between them adapted to receive a saw blade, of slide pins or bolts located between the plates upon which the saw-blade is adapted to rest, and inclining cams for simultaneously feeding these pins or bolts upward, substantially as set forth.

3. The combination with a pair of guide-plates between which the saw blade is adapted to be held, of a series of slide pins or bolts upon which the saw blade rests, a slide plate upon which these pins or bolts rest, said plate having inclines upon which the bolts or pins travel, and means for locking the slide plate in position, substantially as set forth.

4. The combination of a pair of guide plates between which the saw blade to be operated upon is held, one of said plates rigid and the other capable of being moved, a sliding clamping plate, and a lever for locking said clamping plate in position, substantially as set forth.

5. The combination with a pair of guide-plates adapted to receive a saw blade between them, one plate cut away at the center on its inner face, of a sliding clamping plate fitted in this cut away portion, a lever, one end of which is in position to engage and force forward the clamping plate, and means for operating the lever, substantially as set forth.

6. The combination with a pair of guide-plates adapted to receive a saw-blade between them, of a sliding clamping plate having a projection thereon which extends rearward through the guide plate in rear thereof, a rock-lever pivoted in proximity to the clamping plate, said lever having a projecting toe adapted to engage a projection on the clamping plate, and a cam disk against which the long arm of the lever bears and by means of which it is operated, substantially as set forth.

7. The combination with a frame having tracks therein, and spring actuated presser feet pivoted to the frame, of a pivotally supported reciprocating file holder having ears thereon adapted to pass between the tracks and presser feet during one stroke and adapted to pass over the presser feet during the return stroke, whereby the file holder is raised from the saw blade, substantially as set forth.

8. The combination with a suitable housing having a track therein, of a reciprocating file holder adapted to bear normally on the track during alternate strokes, said file holder having ears, and yielding presser feet between which and the track the ears travel during one stroke of the file holder and over which they travel during the alternate strokes, substantially as set forth.

9. The combination with a suitable housing having tracks therein, and a presser frame pivoted to the housing and provided with presser feet located a short distance from the tracks, and a spring adapted to bear upon the presser frame whereby to hold it yieldingly forward, of a file holder, said holder having ears thereon adapted to travel on the tracks during one stroke and be held thereon by the presser feet, and over the feet on the return stroke, and means for reciprocating the file-holder, substantially as set forth.

10. The combination with a suitable housing having tracks, of a reciprocating file holder, and spring actuated presser feet for holding the latter upon the tracks during one movement, and means for switching the holder from the tracks during alternate movements, of a reciprocating cross-head to which the file holder is hinged, and means for reciprocating the cross-head, substantially as set forth.

11. The combination with a saw guide adapted to hold a saw blade, of an oscillating lever for moving the saw, and a cam wheel for oscillating the lever, said cam wheel having one portion constructed to vibrate the lever in advance of the complete swing of the lever whereby to move the saw blade a short distance to clear the teeth of the file.

12. The combination with a saw guide adapted to hold a saw blade, of an oscillating lever having a dog pivoted at one end adapted to travel over and engage the saw teeth, and a cam wheel adapted to oscillate the lever, said cam having one portion constructed to vibrate the lever in advance of the complete swing of the lever whereby to move the saw blade a short distance to clear the teeth of the file, substantially as set forth.

13. The combination with a bed plate, having a guide groove therein, and a saw guide, of an oscillating lever, a slide block, located in the guide groove, screw for sliding said block, a slotted plate projecting from the block, a pivot bolt operating in a slot in this plate and in a slot in the lever, a screw for sliding this pivot, and scales for determining the position to which the pivot is to be shifted, substantially as set forth.

In testimony whereof we have signed this specification in the presence of the subscribing witnesses.

WILLIAM P. GINTER.
WILLIAM STROUS.

Witnesses as to signature of William P. Ginter:
W. CLARENCE DUVALL,
GEO. F. DOWNING.

Witnesses as to signature of William Strous:
J. H. FAGUE,
C. W. BUGH.